(12) United States Patent
Häberle et al.

(10) Patent No.: US 7,717,651 B2
(45) Date of Patent: May 18, 2010

(54) TOOL FOR MACHINING PRECISION BORES

(75) Inventors: Friedrich Häberle, Lauchheim (DE); Dieter Kress, Aalen (DE)

(73) Assignee: Mapal Fabrik Für Präzisionswerkzeuge Dr. Kress KG (DE)

( * ) Notice: Subject to any disclaimer, the term of this patent is extended or adjusted under 35 U.S.C. 154(b) by 904 days.

(21) Appl. No.: 10/589,140

(22) PCT Filed: Feb. 5, 2005

(86) PCT No.: PCT/EP2005/001189
§ 371 (c)(1),
(2), (4) Date: Sep. 26, 2006

(87) PCT Pub. No.: WO2005/077575
PCT Pub. Date: Aug. 25, 2005

(65) Prior Publication Data
US 2007/0172322 A1  Jul. 26, 2007

(30) Foreign Application Priority Data
Feb. 10, 2004  (DE) .................. 10 2004 008 166

(51) Int. Cl.
*B23B 51/00* (2006.01)
(52) U.S. Cl. .................. 408/24; 408/30; 408/224; 451/461
(58) Field of Classification Search .................. 408/22, 408/24, 26, 30, 27, 145, 56, 57, 59, 181, 408/185, 224, 231, 233, 197; 451/461, 464, 451/482; 29/566
See application file for complete search history.

(56) References Cited

U.S. PATENT DOCUMENTS

| | | | |
|---|---|---|---|
| 3,405,049 A | 10/1968 | Czubak | |
| 4,463,490 A * | 8/1984 | Saito et al. | 29/566.1 |
| 5,088,237 A * | 2/1992 | Nagel et al. | 451/27 |
| 5,417,525 A * | 5/1995 | Lenhart | 408/24 |
| 5,478,179 A * | 12/1995 | Kress et al. | 408/199 |
| 5,494,383 A * | 2/1996 | Kress et al. | 408/231 |
| 5,906,458 A * | 5/1999 | Planche | 408/197 |
| 6,238,151 B1 * | 5/2001 | Takagi | 408/230 |
| 6,287,057 B1 | 9/2001 | Kurz | |
| 6,343,902 B1 | 2/2002 | Nishikawa | |
| 6,783,449 B2 * | 8/2004 | Inoue | 451/462 |

FOREIGN PATENT DOCUMENTS

| | | |
|---|---|---|
| BE | 892 165 A1 | 6/1982 |
| DE | 82 30 997 U1 | 4/1984 |

(Continued)

OTHER PUBLICATIONS

English translated International Preliminary Report on Patentability. PCT/EP2005/001189, Total p. 12.
International Search Report PCT/EP2005/001189 dated Jun. 2, 2005.

*Primary Examiner*—Daniel W Howell
(74) *Attorney, Agent, or Firm*—Ostrolenk Faber LLP

(57) ABSTRACT

A tool for the cutting machining of precision bores in workpieces, with
  a first machining step which has at least one geometrically defined cutting edge, and with
  a second machining step which has at least one honing strip with geometrically undefined cutting edges,
is proposed. This is distinguished in that the first machining step has at least three support regions which are arranged at a distance from one another in the circumferential direction and which are designed and arranged such that they are supported on the wall of the precision bore during the machining of the latter.

21 Claims, 4 Drawing Sheets

FOREIGN PATENT DOCUMENTS

| | | |
|---|---|---|
| DE | 3406035 C1 * | 8/1985 |
| DE | 40 08 350 C2 | 9/1991 |
| DE | 44 37 542 A1 | 4/1996 |
| DE | 19830903 | 1/2000 |
| JP | 61030343 A * | 2/1986 |
| JP | 06039607 A * | 2/1994 |

* cited by examiner

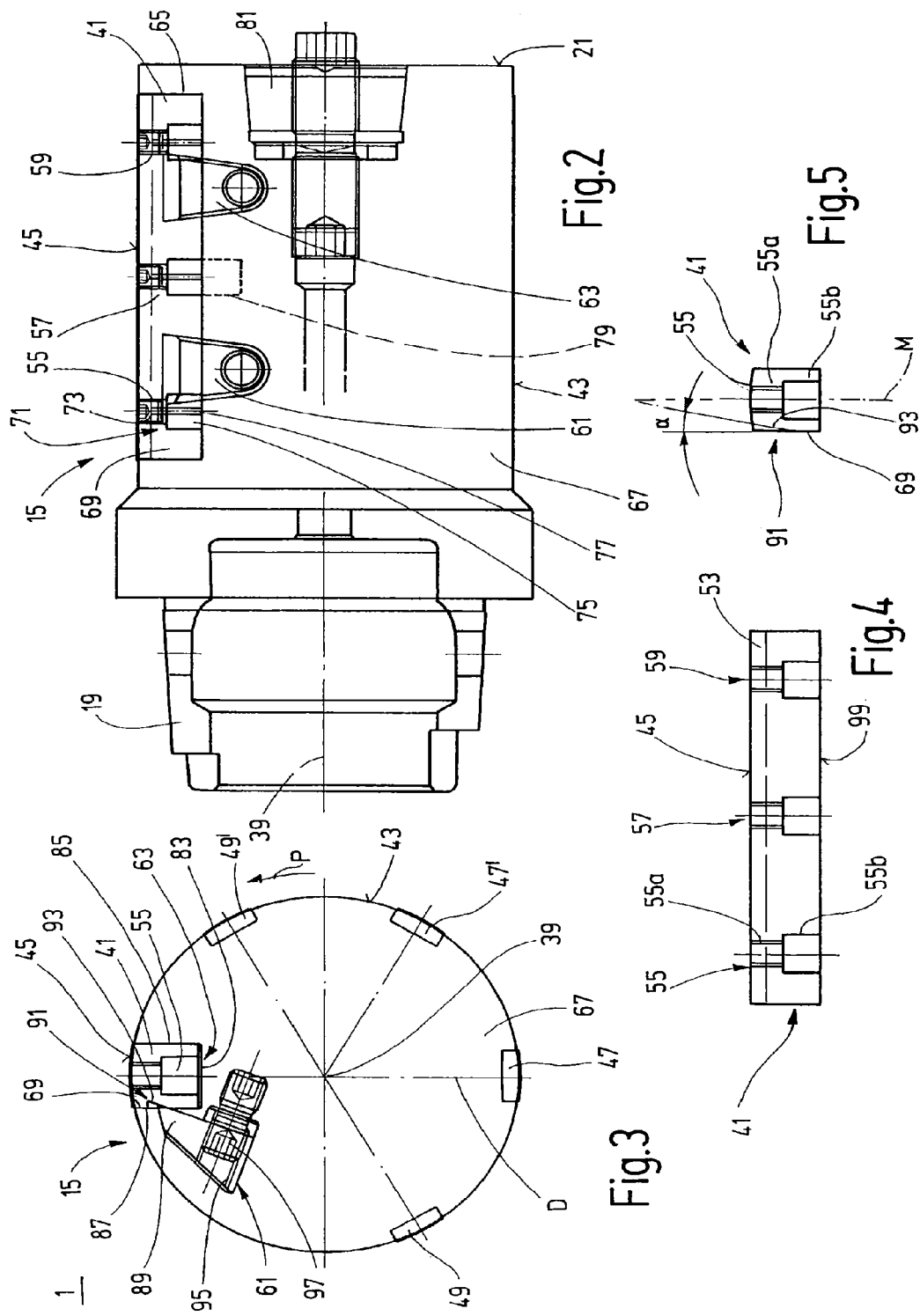

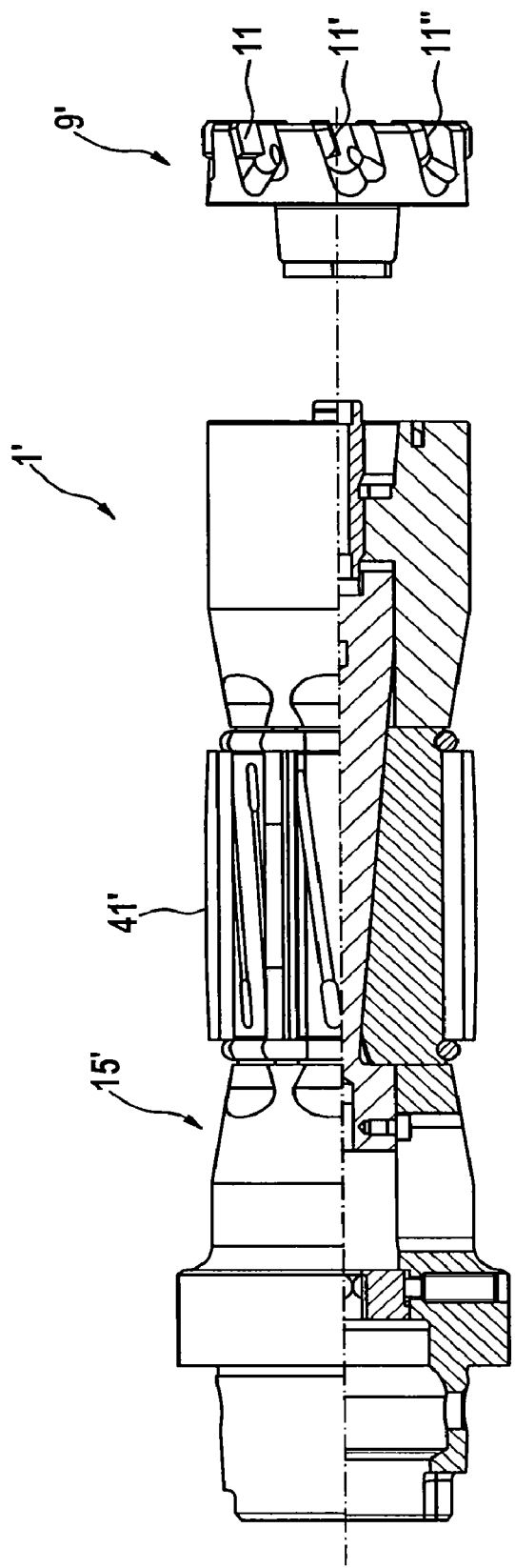

TOOL FOR MACHINING PRECISION BORES

CROSS REFERENCE TO RELATED APPLICATION

The present application is a 35 U.S.C. §§317 national phase conversion of PCT/EP2005/001189, filed Feb. 5, 2005, which claims priority of German Application No. 10 2004 008 166.2, filed Feb. 10, 2004. The PCT International Application was published in the German language.

BACKROUND OF THE INVENTION

1. Field of the Invention

The invention relates to a tool for the cutting machining of precision bores in workpieces.

2. Description of Related Art

Tools of the type referred to here are known (DE 198 30 903 A1). They have a first machining step with at least one geometrically defined cutting edge and a second machining step with at least one honing strip which comprises geometrically undefined cutting edges. It has become apparent that the use of tools of this type is complicated: special guide devices are required, with the aid of which the tool is supported in the workpiece to be machined. Moreover, the machining results are not always satisfactory.

The object of the invention, therefore, is to provide a tool which does not have these disadvantages.

To achieve this object, a tool is proposed in which the first machining step has at least three support regions which are arranged at a distance from one another in the circumferential direction and which are designed and arranged such that they are supported on the wall of a precision bore during the machining of the latter. Since the tool bears directly against the bore wall and not against any guide devices, during the machining of a workpiece it does not require any additional devices which hold the tool in a specific position with respect to said workpiece. The use of the tool is thereby simplified substantially.

BRIEF DESCRIPTION OF THE DRAWINGS

The invention is explained in more detail below with reference to the drawings in which:

FIG. 2 shows a side view of the third machining step according to FIG. 1;

FIG. 3 shows an end view of the third machining step according to FIG. 2;

FIG. 4 shows a longitudinal section through a honing strip, and

FIG. 5 shows a cross section through a honing strip according to FIG. 4,

FIG. 6 shows a modified exemplary embodiment of a tool, and

DESCRIPTION OF THE PREFERRED EMBODIMENTS

Figure 1:
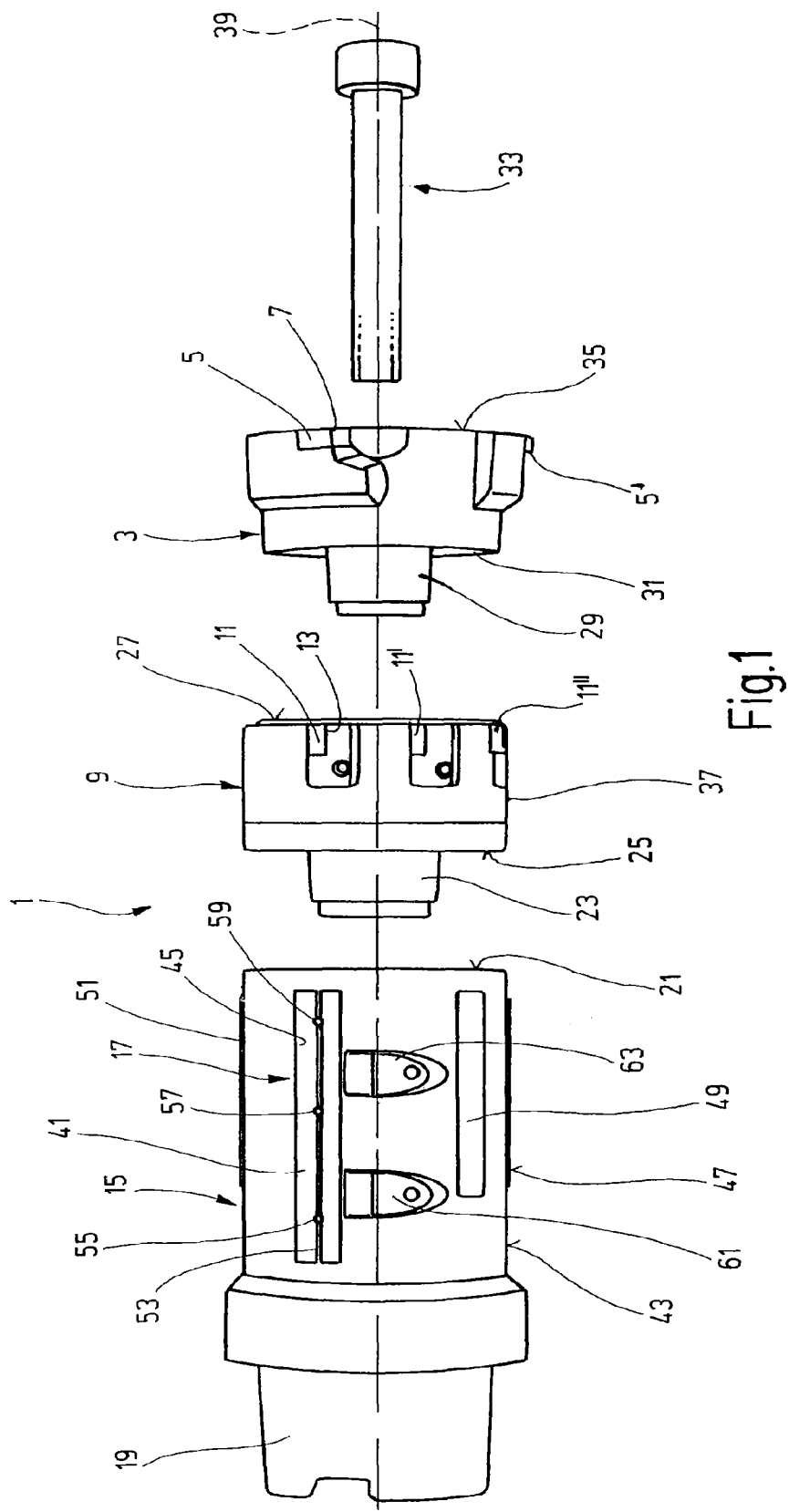
FIG. 1 shows an exploded illustration of a tool with three machining steps.

The tool 1 reproduced in an exploded illustration in FIG. 1 has three machining steps, to be precise a first machining step 3, serving for premachining, with at least one knife plate 5 which has at least one geometrically defined cutting edge 7. Moreover, a second machining step 9 is provided, which serves for further machining and has at least one knife plate 11 with at least one geometrically defined cutting edge 13. Finally, the tool 1 has a third machining step 15 which has at least one geometrically undefined cutting edge 17. At that end of the third machining step 15 which is on the left in FIG. 1, a preferably hollow shank 19 is provided, which serves for fastening the tool 1 in a machine tool and which, as is customary, has a conical circumferential surface narrowing to the left according to FIG. 1.

In that end face 21 of the third machining step 15 which lies opposite the shank 19, a preferably conical recess, not illustrated here, is introduced, which serves for receiving a shank 23 which emanates from the second machining step 9 and the diameter of which is smaller than the outside diameter of the second machining step 9, so that said shank is surrounded by an annular planar surface 25. Correspondingly, in that end face 27 of the second machining step 9 which lies opposite the shank 23, a conical recess, which cannot be seen here, is introduced, into which a shank 29 emanating from the first machining step 3 engages.

It thus becomes clear that the tool 1 is of modular construction, and that the machining steps 3, 9 and 15 are coupled to one another by means of a precision connection, also designated as a short-taper connection. In the assembled state, the end face 21 of the third machining step cooperates with the annular planar surface 25 of the second machining step. Correspondingly, an annular planar surface 31, which surrounds the shank 29 of the first machining step 3, cooperates with the end face 27 of the second machining step 9. This results in an exact alignment of the machining steps with one another; they lie on a common axis due to the centering by the tapers. The modular construction, moreover, makes it possible to exchange machining steps in the event of wear and for producing different tools 1.

Here, for example, a screw 33 is provided, which serves for clamping the first machining step 3 to the second machining step 9 at the third machining step 15.

It becomes clear from FIG. 1 that the tool 1 for the cutting machining of precision bores has three machining steps which are assigned to different types of machining and of which the first and the second machining step 3 and 9 serve for premachining and intermediate machining and the third machining step 15 serves for finish machining. The machining steps are correspondingly arranged as follows: starting from the shank 19 which can be connected to a machine tool, there is first the third machining step 15 for finish machining. This is followed, as seen in the direction of the screw 33, that is to say in the direction of advance, by the second machining step 9. The front side of the tool 1 forms the first machining step 3 which is introduced first into a precision bore to be machined and removes chips from its surface there.

During the machining of a precision bore, the at least one cutting edge 7 of the first machining step 3 acts first. Thereafter, the at least one geometrically defined cutting edge 13 of the second machining step 9 comes into engagement with the bore surface and carries out the further machining or intermediate machining of the bore surface. Only then does the at least one geometrically undefined cutting edge 17 of the third machining step 15 come into engagement with the bore surface.

It is evident from the illustration according to FIG. 1 that the first machining step 3 has a plurality of knife plates which are distributed preferably uniformly on the circumference of the machining step and of which the knife plates 5 and 5' are illustrated here. The knife plates 5, 5', etc. of the first machining step 3 are tangential plates and are arranged so as to be virtually countersunk into the end face 35 of the first machining step 3.

The second machining step 9 here has a plurality of knife plates which are inserted into the circumferential surface 37 of the second machining step. For example, six to eight such knife plates may be provided, their number also depending on the size of the machining step 9, that is to say on its diameter. The knife plates 11, 11' and 11" are evident in FIG. 1. They are inserted into grooves which run radially with respect to the center axis 39 of the tool 1 and therefore also with respect to the center axis of the second machining step 9. The knife plates in the first and the second machining steps 3 and 9 are fastened in a known way, preferably firmly screwed or fixed by means of clamping claws. It is also conceivable to solder these knife plates in firmly.

FIG. 1 also shows that the geometrically undefined cutting edge 17 is designed here as a honing strip 41 which has hard material particles, and, at least in its outer face 45 projecting beyond the circumferential surface 43 of the third machining step 15, is provided with hard material particles. FIG. 1 also reveals that guide strips, of which the guide strips 47, 49 and 51 can be seen here, are introduced into the circumferential surface 43.

In the exemplary embodiment of the third machining step 15, as illustrated here, there is provision for the honing strip 41 to have in its outer face 45 preferably a coolant/lubricant groove 53 which runs parallel with respect to the center axis 39 in the same way as the honing strip 41 and the guide strips. At least one, here three bores 55, 57 and 59, which serve as an outlet for a coolant/lubricant, issue into this groove 53.

The honing strip 41 is firmly clamped and securely held by at least one, here two clamping claws 61, 63 which are arranged laterally on one longitudinal side of the honing strip 41.

The tool evident from FIG. 1 is therefore distinguished by the combination of two machining steps having geometrically defined cutting edges with a machining step which has a geometrically undefined cutting edge.

FIG. 2 shows part of the tool 1, to be precise the third machining step 15. The machining step 15, in the illustration according to FIG. 2, is rotated about the center axis 39 in such a way that the honing strip 41 is arranged on top. The illustration according to FIG. 2 is enlarged, as compared with that in FIG. 1. Identical parts are given the same reference numerals, and therefore, to that extent, reference is made to the preceding description. FIG. 2 serves particularly for a further explanation of the exchangeable honing strip 41. The latter is inserted into a groove 65 which is introduced into the basic body 67 of the third machining step 15. Said honing strip is held by the two clamping claws 61 and 63, the clamping lips of which lie on a side face 69 of the honing strip 41 and firmly clamp the latter in the basic body 67. This is discussed in more detail below.

The honing strip 41 has introduced into it the three bores 55, 57 and 59 which penetrate completely through its basic body, starting from its outer face 45. The bores 55, 57 and 59 are designed here as a stepped bore and have a radially outer first region of smaller inside diameter and a radially inner region of larger inside diameter. The bores 55, 57 and 59 serve for receiving an adjusting device 71 which is preferably identical in all the bores. Only the adjusting device 71 which is arranged in the bore 55 is therefore dealt with. It has a first regulating means 73 arranged in the first region of the bore 55 which is adjacent to the outer face 45 of the honing strip 41. A second regulating means 75 which bears against the basic body 67 lies in the second region of the bore 55. The first regulating means 73 is preferably designed as a regulating screw and the second regulating means 75 as a thrust piece. The latter preferably consists of hard metal, so that a pressure force exerted by the regulating screw does not damage the surface of the thrust piece.

It is evident from FIG. 2 that the two regulating means 73 and 75 have an essentially radially running coolant/lubricant duct 77 passing through them.

When the regulating screw of the first regulating means 73 is screwed further into the interior of the honing strip 41, said regulating screw presses the thrust piece of the second regulating means 77 radially inward in the direction of the center axis 39, so that the honing strip 41 is pushed radially out of the groove 65. It therefore becomes clear that the radial position of the honing strip 41, that is to say the projection of the outer face 45 beyond the circumferential surface 43 of the third machining step 15, can be set. In order to ensure a uniform setting of the projection of the honing strip 41, three bores 55, 57 and 59 are provided here, which receive identical adjusting devices 71 of the type described above.

It can be seen that the adjusting device 71 may be modified in as much as the second regulating means 75 may also be arranged in a suitable bore 79 in the basic body 67 of the third machining step 15. This is indicated by dashed lines in relation to the bore 57 in FIG. 2. In this case, the second regulating means 75 in the honing strip 41 may be dispensed with. However, the first regulating means 73, to be precise the regulating screw, must be adapted accordingly. In this case, the bore 55, 57, 59 may have a uniform diameter over its length.

FIG. 2 also shows the conical depression 81 which is introduced into the end face 21 of the third machining step 15 and which was explained with reference to FIG. 1 and serves for receiving the conical shank 23 of the second machining step 9.

The guide strips are omitted in FIG. 2 for the sake of simplification.

FIG. 3 shows an end view of the third machining step 15 according to FIG. 2. Identical parts are given the same reference numerals, and therefore, to that extent, reference is made to the description of the preceding figures, so as to avoid repetition. The illustration according to FIG. 3 is simplified and serves for clarifying the fixing of the honing strip 41 in the basic body 67 of the third machining step 15.

The honing strip 41 is introduced into a groove 65 which is introduced into the basic body 67 and which runs essentially parallel with respect to the center axis 39 of the tool 1 and consequently of the third machining step 15 and is of essentially rectangular design, as seen in the cross section according to FIG. 3. Said groove has a base 83 which preferably has a coolant/lubricant outlet in each case in the regions of the bores 55, 57 and 59, so that a medium emerging here can emerge through the coolant/lubricant duct 77 which passes through the regulating means 73 and 75. The coolant/lubricant consequently passes into the coolant/lubricant groove 53 of the honing strip 41 which was explained with reference to FIG. 1.

The groove 65 is delimited by two side flanks 85, 87 standing essentially perpendicularly on the base 83, the side flank 85 which is on the right in FIG. 3 serving as bearing contact for the honing strip 41, and the side flank 87 which is on the left in FIG. 3 being pierced, so that the clamping claws act on the side face 69 of the honing strip 41 and can press the latter against the side face 85 and the base 83. FIG. 3 illustrates by way of example the clamping claw 61 which retains the honing strip 41 by means of a clamping lip 89. Said honing strip is provided, on the side face 69 facing the clamping claw 61, with a clamping groove 91 which has a clamping face 93.

The clamping claw 61 has a through bore 95 which is penetrated by a tension screw 97. The latter is provided here, by way of example, with two contradirectional threaded regions, one of which cooperates with the clamping claw 61 and the other of which cooperates with the basic body 67 of the third machining step 15.

FIG. 3 shows again the bore 55 which penetrates through the honing strip 41 perpendicularly, that is to say in the direction of a diametral line D, and, on the one hand, issues in the outer face 45 of the honing strip 41 and, on the other hand, opens toward the base 83 of the groove 65. The radially outer region of smaller diameter of the bore 55 is provided with an internal thread which cooperates with the first regulating means which, according to the statements made above, is designed, for example, as a regulating screw.

It is evident from the illustration according to FIG. 3 that the tool 1 or the third machining step 15 has a plurality of guide strips which are inserted into the circumferential surface 43 and some of which could be seen in FIG. 1. A guide strip 47 is provided opposite the honing strip 41, and, in the illustration according to FIG. 3, on the left of it a guide strip 49 and on the right of it a guide strip 47'. A guide strip 49' lies opposite the guide strip 49.

By means of the guide strips, the third machining step 15 is guided and supported highly accurately in the precision bore to be machined, so that antipenetration cutting forces are reliably absorbed. This leads to the establishment of an exact bore geometry.

The guide strips preferably consist of hard metal, cermet or polycrystalline diamond. It is also possible for only the surface of the guide strips which projects beyond the circumferential surface of the tool 1 to be produced completely or partly from abrasion-resistant material or to be coated with this.

It can be seen from FIG. 3 that, as seen in the direction of rotation indicated by an arrow P, the guide strip 49 trails the guide strip 47 by approximately 60°, whereas, as compared with this, the guide strip 47' leads the guide strip 47 by about 60°. The guide strip 49' trails the honing strip 41 by about 60°, measured from the diametral line D.

FIG. 4 shows a longitudinal section through the honing strip 41. Identical parts are given the same reference numerals, and therefore, to that extent, reference is made to the preceding description. It becomes clear from the illustration chosen here that the honing strip 41 is penetrated from the top downward by three bores 55, 57 and 59 arranged at an equal distance from one another, a first portion 55a having a smaller diameter and being provided with an internal thread, and a second, inner portion 55b being equipped with a larger inside diameter. The bores 57 and 59 are correspondingly likewise designed as a stepped bore.

The bores, on the one hand, penetrate through the outer face 45 of the honing strip and issue in the coolant/lubricant groove 53, merely indicated here. Since, on the other hand, the bores 55, 57 and 59 pierce the underside 99 of the honing strip 41, a coolant/lubricant can be fed from below, that is to say, for example, through the base 83 of the groove 65, and can flow through the bores 55, 57 and 59 or the coolant/lubricant duct 77 which penetrates through the regulating means 73 and 75, not illustrated here.

FIG. 5 shows the honing strip 41 once again in cross section. Identical parts are given the same reference numerals, and therefore, to that extent, reference is made to the description of the preceding figures.

It becomes clear that the honing strip 41 is penetrated by a continuous bore 55 which is designed here as a stepped bore, because part of the adjusting device 71, to be precise the second regulating means 75, is accommodated in the honing strip 41. For this purpose, the lower part of the bore 55, the region 55b, is provided with a larger inside diameter. The upper region 55a has a smaller inside diameter and is provided with an internal thread so as to be capable of cooperating with the first regulating means 73, a regulating screw.

As stated above, the second regulating means 75 may also be displaced into the basic body of the third machining step, so as not to weaken the honing strip 41 excessively. The lower portion 55b of the bore 55 is consequently then dispensed with.

FIG. 5 shows the side face 69, into which at least one clamping groove 91 is introduced for the at least one clamping claw, that is to say, here, for the clamping claws 61 and 63. Said clamping groove has a clamping surface 93 which, as seen from the bottom upward, is inclined with respect to an imaginary center plane M of the honing strip 41. The angle corresponds to the angle α between the side face 69 and the bottom of the clamping surface 93, as reproduced in FIG. 5. The angle α amounts to 10°.

The following statement is to be made as regards the functioning of the tool 1:

The tool 1 serves for the machining of precision bores in workpieces, on the one hand an exact bore geometry in terms of diameter, roundness and cylindrical shape being generated, but, on the other hand, a surface structure is also to be provided, which can be adapted optimally to the function of the bore. It is thus possible to ensure that bearings installed in the bore are held reliably. In particular, however, it is possible to design the surface structure such that a lubricating film is formed in the region of lubricating sliding surfaces.

This aim is achieved in that the tool 1 is of modular construction and has two machining steps 3 and 9 having in each case at least one knife plate 5 and 11 possessing geometrically defined cutting edges 7, 13. These serve for the cutting machining of the surface of the precision bore and for generating the desired bore geometry. When the tool 1 is introduced into a bore to be machined, first, the foremost first machining step 3 comes into engagement with the bore wall, then followed by the second machining step 9. Since the first machining step 3 and the second machining step 9 are aligned highly accurately with one another and with the third machining step 15, the precision bore can be premachined and intermediately machined highly accurately with the aid of the first two machining steps. The dimensional deviation of the machined precision bore with respect to the desired dimension is approximately 1/100 mm to 2/100 mm after the intermediate machining.

In the third machining step, finish machining, the wall of the precision bore is machined with the aid of the third machining step 15 which has at least one geometrically undefined cutting edge 17 designed, here, as a honing strip 41. The honing strip either is constructed completely from hard material particles or has, at least in the region of its outer face 45, hard material particles which come into engagement with the bore to be machined. The tool 1 is first set in rotation, while the first and the second machining step 3 and 9 machine the precision bore. During the machining of the bore surface by means of the third machining step 15, a superposed movement consisting of an axial speed, also designated as advance, and of a circumferential speed (tangential speed) is imparted to the tool 1 in the bore. This gives rise, in the machined bore surface, to crossed machining scores which have a good oil-holding capacity. The direction of the axial speed is reversed periodically, so that the tool 1 is moved to and fro in the axial direction in the precision bore to be machined. The direction of rotation of the tool 1 is maintained during machining.

The surface which occurs can be influenced by a variation in the axial speed/circumferential speed ratio, in order to generate a desired pattern of machining scores.

During finish machining by means of the third machining step 15, finally, only approximately 1/100 mm to 2/100 mm still has to be removed. Since the third machining step 15 is aligned highly accurately with the second machining step 9 and the first machining step 3, the cardanic suspension conventional for honing tools may be dispensed with. It is therefore possible to connect the third machining step 15 rigidly to the other machining steps 9 and 13 and, via the shank 19, to a machine tool.

Owing to the low oversize remaining for finish machining, the third machining step 15 has to be moved to and fro in the axial direction only one to three times in the precision bore to be machined. This shortens the machining time for the precision bore in a lasting manner. According to the statement made above, the minimization of the strokes is possible because the third machining step 15 is arranged in highly accurate alignment with the other machining steps, and only a very low cutting depth is required. A decisive advantage of the tool described here is therefore that the latter can be used on normal machine tools, because the cardanic suspension conventional for honing tools may be dispensed with and there is no need for any additional supporting and/or guide devices.

It is particularly advantageous that the tool 1 has a coolant/lubricant supply which supplies at least the third machining step 15, so that the medium can pass out of the bores 55, 57 and 59 in the honing strip 41 into a coolant/lubricant groove 53 introduced in the outer face 45 of the latter.

The coolant/lubricant supply may even reach as far as the second and the first machining step 9, 3, in order to supply coolant and lubricant to the respective cutting edges 7, 11 during the machining of a bore surface through ducts which are basically known.

It becomes clear that the third machining step can be supported in the machined bore surface with the aid of the guide strips 49, 49', 47, 47'. Moreover, it is possible to insert even more than one honing strip into the circumferential surface 43 of the third machining step 15.

It is of decisive importance that, due to the modular construction of the tool 1, a cutting machining of the precision bore with the aid of the geometrically defined cutting edges and with the aid of the honing strip having a geometrically undefined cutting edge can take place in a single machining pass without a tool change. The alignment of the machining steps 3, 9 and 15 with one another is highly accurate, because short-taper clamping ensuring high rigidity is implemented at the individual connection points, in that the shank 23 of the second machining step 9 can engage into a recess 81 of the third machining step 15, the end face 21 and the planar surface 25 cooperating with one another in the region of the connection point, thus leading to an exact radial alignment and angular orientation of the second machining step 9 with respect to the third machining step 15. Correspondingly, a high rigidity and an exact alignment of the first machining step 3 with respect to the second machining step 9 are achieved, in that the shank 29 is inserted into a corresponding recess in the second machining step, here the end face 27 of the second machining step 9 cooperating with the annular planar surface 31 of the first machining step 3. Since the machining steps 3, 9 and 15 are positioned exactly in relation to another and lie on a common center axis 39, the quality of the machined precision bore is increased.

On the one hand, ultimately, a very good bore geometry is obtained, while at the same time a desired surface structure is implemented. The individual machining stages of premachining, intermediate machining and finish machining can be carried out by means of only chucking on the same production apparatus, that is to say the tool 1 has to be chucked only once in a machine tool. A tool change is thus avoided, with the result that positioning errors occurring during rechucking are eliminated. Moreover, it is not necessary to transfer the component to a plurality of machines. Finally, additional support/guidance may also be dispensed with, which signifies further simplification, since the tool can thus be used on normal machining centers; the use of special machines is unnecessary.

In the explanations of the preceding figures, it is assumed that the tool 1 has three machining steps. However, the above-mentioned advantages can also readily be implemented with a tool which is provided with only two machining steps. For example, the first machining step 3 which serves for premachining and which was explained with reference to FIG. 1 may be dispensed with.

A tool 1' of this type is illustrated in FIG. 6. It has a first machining step 9' and a second machining step 15', the first machining step 9' corresponding to the second machining step 9 of the tool 1 of FIG. 1. The first machining step 3 of the tool 1 according to FIG. 1 is omitted in the exemplary embodiment of the tool 1' according to FIG. 6.

Accordingly, the first machining step 9' of the tool 1' is constructed essentially in the same way as the second machining step 9 of the tool 1 in FIG. 1. Reference is therefore made to the description of this machining step according to FIG. 1.

The first machining step 9' has a number of knife plates, of which the knife plates 11, 11' and 11" are identified here by reference numerals. The first machining step 9' can be coupled to the second machining step 15' via a precision interface which, here too, is designed as a short-taper connection.

It must be stated, as regards the first machining step 9', that this, like the machining steps 3 and 9 of the tool 1 according to FIG. 1, has a number of knife plates. It may be pointed out expressly here, however, that the geometrically defined cutting edges of the knife plates may also be implemented directly on the basic body of the respective machining steps. It is more cost-effective, however, to use exchangeable knife plates than to implement geometrically defined cutting edges directly on the machining steps 3, 9 or 9' of the tools 1 or 1'.

It is critical that, in the first machining step 9' of the tool 1' according to FIG. 6, at least three support regions are implemented, via which the tool 1' is supported directly on the bore wall during the machining of a precision bore, so that any external guide devices may be dispensed with.

The same also applies to the tool 1 according to FIG. 1: in at least one of the machining steps 3 and 9, at least three support regions are provided, via which the tool 1 is supported directly on the bore wall during the machining of a precision bore, without any other guide devices being necessary for guiding the tool.

The term "support region" is used very generally in connection with the explanations given here. It is assumed, in this case, that, during the machining of a bore surface by means of a geometrically defined cutting edge, reaction forces are introduced into this, which are based on the cutting forces exerted by the cutting edge. The reaction forces act on the tool which is supported at at least two further support surfaces on the bore wall and is guided by these. Single-edge reamers, for example, are known, with a geometrically defined cutting edge formed, as a rule, on a knife plate and with two guide strips, of which a first trails the cutting edge by approximately 40', as seen in the direction of rotation of the tool, and a second is arranged opposite the cutting edge.

The term "support region" therefore not only refers to surfaces which, like guide strips, slide along on the surface of the machined precision bore. On the contrary, it also embraces cutting edges which remove chips from the bore surface.

Accordingly, in the case of a two-edge tool, it is assumed that the geometrically defined cutting edges in this respect also form support regions, because cutting forces and reaction forces are built up here. As a rule, two-edge tools also have, in addition to the two cutting edges, three guide strips, via which the tool is supported on a bore surface, without any engagement into the surface taking place in the region of the guide strips.

The support regions referred to here may be implemented in that the machining steps 3 and/or 9 of the tool 1 according to FIG. 1 and the machining step 9' of the tool 1' according to FIG. 6 have three knife plates, by means of which the tool 1, 1' is supported on the bore wall.

Figure 7:
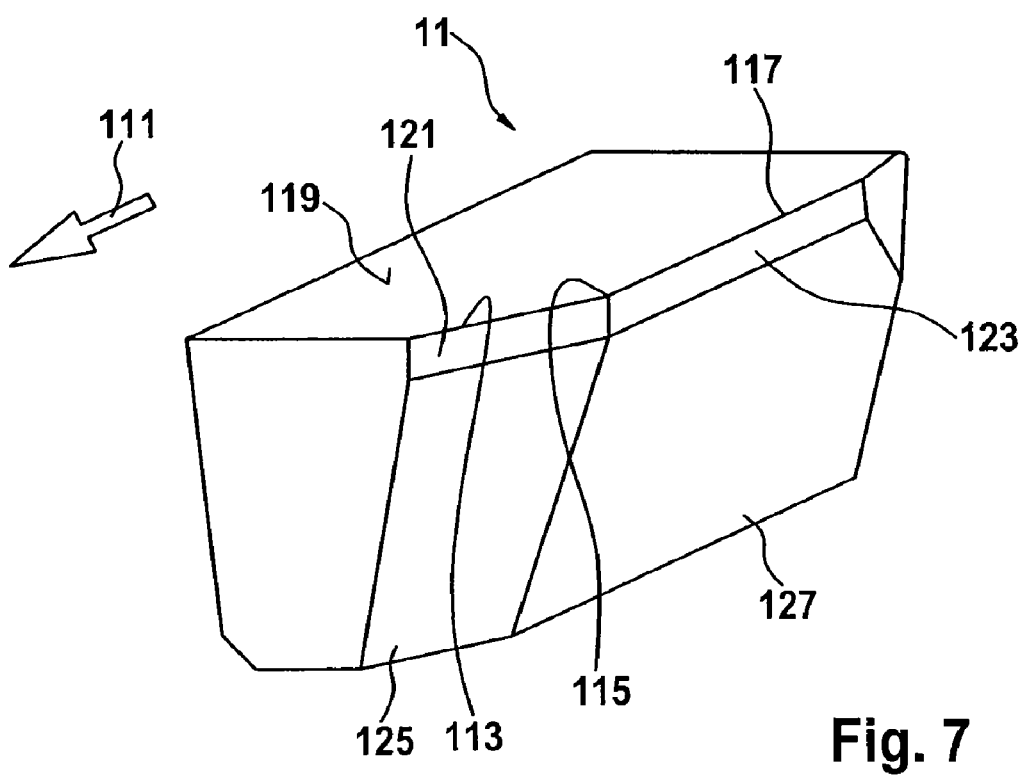
FIG. 7 shows a perspective view of a knife plate obliquely from the front.

Should support take place solely via knife plates, these are provided with a circularly ground chamfer, this being dealt with in more detail with reference to FIG. 7. If the machining steps 3 and/or 9 of the tool 1 or the machining step 9' of the tool 1' according to FIG. 6 has geometrically defined cutting edges directly on the basic body of the machining steps, that is to say is designed without knife plates, then these cutting edges are also to be assigned circularly ground chamfers in order to support the tool 1, 1'.

In the tool 1 according to FIG. 1, there is provision for the second machining step 9 to comprise, for example, six to eight knife plates. Correspondingly, six to eight geometrically defined cutting edges may also be implemented directly on the basic body of the machining step. The same applies to the machining step 9' of the tool 1' according to FIG. 6. The circularly ground chamfers of the cutting edges form the support regions for the machining step.

The statements regarding the third machining step 15 of the tool 1 according to FIG. 1 apply accordingly to the second machining step 15' of the tool 1' according to FIG. 6: here, at least one geometrically undefined cutting edge is provided, preferably at least one honing strip 41', which has geometrically undefined cutting edges. Honing strips are basically known, and therefore these are not explained in any more detail here. In this exemplary embodiment, too, guide strips may be provided for the machining step 15' equipped with honing strips, as explained above in connection with the tool 1.

The exemplary embodiment of the tool 1' according to FIG. 6 is distinguished in that the desired surface structure referred to above can be implemented during the machining of a precision bore, because, here too, geometrically undefined cutting edges are used in addition to geometrically defined cutting edges.

Moreover, it is shown that the exemplary embodiment of the tool 1 according to FIG. 1 and the exemplary embodiment of the tool 1' according to FIG. 6 ensure that said tool is supported at least three points on a bore wall while the latter is being machined. There is therefore an optimal guidance of the tool within the machined bore, so that external guide devices may be dispensed with. This makes it appreciably easier to use the tool 1, 1'. Furthermore, the tool 1, 1' described here may be used in a conventional machining center. The machining of the precision bore may take place on one and the same machine, so that the workpiece does not have to be transferred to a plurality of machines and chucked there. Tool changes, such as are often necessary in conventional machines, are also dispensed with, so that positioning errors occurring during rechucking are eliminated. This increases the quality of the machined bore.

The modular construction, using precision interfaces, ensures that an exact axial alignment and angular orientation of the machining steps of the tool 1, 1' are ensured.

The advantages described here, on the one hand, can be implemented in the case of tools, the geometrically defined cutting edges of which are formed directly by the basic body of a machining step. Preferably, however, there is provision for inserting knife plates into the basic body of the machining steps, these knife plates being soldered in or being capable of being fastened in another way to the basic body of the machining step.

FIG. 7 shows a knife plate 11 in a perspective view obliquely from the front. Regardless of the actual shape of the knife plate 11, the latter always has a main cutting edge 113 descending in the direction of advance indicated by an arrow 111. Descending means here that, as seen in the direction of advance, the main cutting edge approaches the axis of rotation, not illustrated here, of the machining step. The main cutting edge 113 merges via a vertex 115 into the secondary cutting edge 117. The latter is inclined in the opposite direction and, as seen in the direction of advance, ascends in the direction of the vertex 115. It is thus shown that the main cutting edge 113 and the secondary cutting edge 117 are inclined in opposite directions from the vertex 115.

The knife plate 11 is arranged in FIG. 7 such that a chip face 119, on which the chips removed by the main and secondary cutting edges run off, lies on top. It merges into the main and secondary cutting edges 113, 117.

In the region of the main cutting edge 113, a first flank 121 is provided, which is inclined at an angle of less than 90° with respect to the chip face 119, that is to say, in FIG. 7, does not descend vertically downward. The secondary cutting edge 117 has adjoining it a first flank 123.

It was stated above that at least one of the machining steps 3 and 9 of the tool 1 according to FIG. 1 and the machining step 9' of the tool 1' according to FIG. 6 have at least three support regions. The definition of the term "support region" has already been discussed above. In connection with the explanations given here, therefore, it is also assumed that, in the case of a single-edge reamer, a cutting edge without a circularly ground chamfer forms one support region for this tool, the two further support regions being implemented by guide strips. According to the definition given here, therefore, a single-edge reamer has three support regions. In this connection, it is also possible to implement the at least three support regions by means of at least three cutting edges having in each case a circularly ground chamfer. At least three guide strips may also be used in conjunction with cutting edges which have no circularly ground chamfer.

The circularly ground chamfer is produced in the region of the first flank 123 of the secondary cutting edge 117. This region is then designed to be curved such that the chip face 119 has adjoining it a curved region, the radius of curvature of which is measured from the axis of rotation of the tool 1, 1'. The radius of curvature preferably corresponds to that of the precision bore to be machined.

The first flank 121 of the main cutting edge 113 has adjoining it a second flank 125 which descends at a steeper angle than the first flank 121. Correspondingly, the first flank 123 of the secondary cutting edge 117 has adjoining it a second flank 127 which likewise has a greater inclination than the first flank 123.

The second flanks 125, 127 are preferably of planar design, as is often the case in conventional knife plates.

If the main cutting edge 113 and the secondary cutting edge 117 are implemented directly on the basic body of a machining step, then, there too, the design of the region of the main and secondary cutting edges is provided such as was described with reference to the knife plate 11. In particular, then too, a circularly ground chamfer may be provided in the region of the first flank 123 of a secondary cutting edge 117, in order to produce a support region.

In any event, it becomes clear that the tool 1 according to FIG. 1 and the tool 1' according to FIG. 6 have at least three support regions in the region of a machining step having at least one geometrically defined cutting edge. The at least three support regions on one or both machining steps of the tool 1 according to FIG. 1 and on the machining step 9' of the tool 1' according to FIG. 6 can thus be implemented in the way described above.

The invention claimed is:

1. A tool for the cutting machining of precision bores in workpieces, comprising:
    a first machining step with at least one geometrically defined cutting edge,
    a second machining step with at least one honing strip having geometrically undefined cutting edges,
    wherein the first machining step and the second machining step are operable to perform different types of machining, and
    the first machining step has at least three support regions which are arranged at a distance from one another in a circumferential direction and are designed and arranged such that they are supported on the wall of the precision bore during the machining of the precision bore,
    wherein each of the at least three support regions comprises at least one of a guide strip and a geometrically defined cutting edge having a circularly ground chamfer.

2. The tool as claimed in claim 1, wherein at least one of the at least three support regions comprises the geometrically defined cutting edge having a circularly ground chamfer.

3. The tool as claimed in claim 1, wherein each of the at least three support regions comprises the geometrically defined cutting edge having a circularly ground chamfer.

4. The tool as claimed in claim 1, wherein at least one geometrically defined cutting edge is part of a knife plate.

5. The tool as claimed in claim 1, wherein at least one of the at least three support regions comprises the guide strip, the guide strip being supported on the surface of the precision bore during the machining of the precision bore.

6. The tool as claimed in claim 1, further comprising a groove in a base body of the tool and which runs parallel with respect to a center axis of the tool, the honing strip being in the groove.

7. The tool as claimed in claim 6, wherein the groove has a base and two side faces emanating from the base and is of rectangular design, as seen in cross section.

8. The tool as claimed in claim 1, wherein the honing strip is exchangeable and is capable of being set.

9. The tool as claimed in claim 8, further comprising at least one clamping claw, the honing strip having at least one clamping groove with a clamping surface in a side face of the honing strip facing the clamping claws, the honing strip being held by the clamping claw.

10. The tool as claimed in claim 9, wherein the clamping surface is inclined with respect to an imaginary center plane of the honing strip, and the clamping surface approaches the center plane from the bottom upward.

11. A tool for the cutting machining of precision bores in workpieces, comprising:
    a first machining step with at least one geometrically defined cutting edge,
    a second machining step with at least one honing strip having geometrically undefined cutting edges,
    wherein the first machining step and the second machining step are operable to perform different types of machining, and
    the first machining step has at least three support regions which are arranged at a distance from one another in a circumferential direction and are designed and arranged such that they are supported on the wall of the precision bore during the machining of the precision bore,
    the tool further comprising a groove in a base body of the tool and which runs parallel with respect to a center axis of the tool, the honing strip being in the groove,
    wherein the groove has a base and two side faces emanating from the base and is of rectangular design, as seen in cross section, and
    wherein the honing strip has at least one bore for receiving a first regulating device of an adjusting device.

12. The tool as claimed in claim 11, wherein at least one honing strip and a body of the tool is provided with a bore for receiving a second regulating device of the adjusting device, the second regulating device being a thrust piece.

13. The tool as claimed in claim 12, wherein the first regulating device and the second regulating device have a continuous coolant/lubricant duct.

14. The tool as claimed in claim 13, wherein the base of the groove has at least one coolant/lubricant outlet.

15. The tool as claimed in claim 14, wherein the at least one coolant/lubricant outlet is in alignment with the continuous coolant/lubricant duct in the first regulating device and the second regulating device.

16. The tool as claimed in claim 11, wherein the honing strip has an outer surface that engages the surface of the precision bore during machining of the precision bore, the outer surface of the honing strip having a coolant/lubricant groove intersecting the at least one bore for receiving the first regulating device.

17. The tool as claimed in claim 1, further comprising a third machining step.

18. The tool as claimed in claim 17, wherein the third machining step includes at least one guide strip thereof.

19. The tool as claimed in claim 17, wherein the tool is of modular construction and each of the machining steps thereof is exchangeable.

20. The tool as claimed in claim 1, wherein the machining steps are connected to one another by a precision interface.

21. A tool for the cutting machining of precision bores in workpieces, comprising:
    a first machining step with at least one geometrically defined cutting edge,
    a second machining step with at least one honing strip having geometrically undefined cutting edges,
    wherein the first machining step and the second machining step are operable to perform different types of machining, and
    the first machining step has at least three support regions which are arranged at a distance from one another in a circumferential direction and are designed and arranged such that they are supported on the wall of the precision bore during the machining of the precision bore, and
    wherein the first machining step has a cylindrical shape.

* * * * *